United States Patent [19]
Lee

[11] Patent Number: 5,568,294
[45] Date of Patent: Oct. 22, 1996

[54] LIQUID CRYSTAL DISPLAY DEVICE HAVING A POLYMER FUNCTIONING AS AN ORIENTATION LAYER AND A RETARDER

[75] Inventor: Jong-chun Lee, Suwon, Rep. of Korea

[73] Assignee: Samsung Display Devices Co., Ltd., Kyungki-do, Rep. of Korea

[21] Appl. No.: 297,531

[22] Filed: Aug. 31, 1994

[30] Foreign Application Priority Data

Aug. 31, 1993 [KR]  Rep. of Korea .................. 93-17139

[51] Int. Cl.$^6$ ............. G02F 1/1335; G02F 1/1337; C09K 19/00
[52] U.S. Cl. .................. 359/73; 359/75; 428/1
[58] Field of Search .................. 359/73, 75; 428/1

[56] References Cited

U.S. PATENT DOCUMENTS

| | | | |
|---|---|---|---|
| 3,834,792 | 9/1974 | Janning | 350/160 LC |
| 3,994,567 | 11/1976 | Matsuo et al. | 350/160 LC |
| 4,469,408 | 9/1984 | Kruger et al. | 350/340 |
| 5,067,797 | 11/1991 | Yokokura et al. | 359/76 |
| 5,179,457 | 1/1993 | Hirataka et al. | 359/73 |
| 5,326,496 | 7/1994 | Iida et al. | 359/73 |
| 5,380,459 | 1/1995 | Kanemoto et al. | 359/75 |
| 5,413,657 | 5/1995 | Yamanashi et al. | 359/73 |

*Primary Examiner*—Wael M. Fahmy
*Assistant Examiner*—Fetsum Abraham
*Attorney, Agent, or Firm*—Leydig, Voit & Mayer

[57] ABSTRACT

A liquid crystal display comprises a pair of substrates, transparent electrodes respectively formed thereon and a liquid crystal material layer inserted between the electrodes, and is characterized in that a liquid crystalline polymer orientation layer is formed on at least one of the liquid crystal material layers, and the liquid crystalline polymer orientation layer functions as an optical phase retardation film. The phase retardation of the light transmitting liquid crystal layer is compensated by the liquid crystalline polymer orientation layer, which enhances contrast. The liquid crystalline polymer layer can also be used as an optical phase retardation film.

17 Claims, 1 Drawing Sheet

LIQUID CRYSTAL DISPLAY DEVICE HAVING A POLYMER FUNCTIONING AS AN ORIENTATION LAYER AND A RETARDER

BACKGROUND OF THE INVENTION

The present invention relates to a liquid crystal display (LCD), and more particularly, to an LCD having means for orientation and optical phase retardation.

Since surface orientation of a liquid crystal is an important method in deriving a uniform orientation of liquid crystal molecules without any affect due to an electric or magnetic field nor intense light, generally, among the core manufacturing techniques of LCDs, the surface orientation of liquid crystal in a thin film state is very important. Various known methods include the vacuum deposition of silicon oxide, the rubbing of a polymer film (e.g., polyimide, nylon, Teflon and polyvinyl alcohol), the manufacture of grooves, the manufacture of a Langmuir Blodgett polyimide layer, and the adsorbing of surfactant to a surface layer. Considering mass productivity and reliability, the above polyimide rubbed layer is widely used (see U.S. Pat. Nos. 3,834,792 and 3,994,567).

One important physical variable in liquid crystal orientation is the pre-tilt angle at the orientation surface of a liquid crystal molecule. The pre-tilt angle in a twisted nematic (TN) LCD is relatively small (about 1° to 2°) and, in a super twisted nematic (STN) LCD, is relatively large (about 4° to 8°). The orientation pre-tilt angle is an important variable in the maximization of the liquid crystal twist angle in STN LCDs, the minimization of a critical voltage value during operation, and the optimization of reaction velocity considering electro-optic characteristics.

In a surface-stabilized LCD utilizing ferroelectric liquid crystal (FLC), the pre-tilt angle of the liquid crystal must be about 20° or greater. Achieving such a large angle is known to be difficult in the implementation of the conventional polyimide rubbing method.

Orientation of liquid crystals utilizing a rubbed polymer film is determined by an interaction through electromagnetic force between liquid crystal molecules and orientation material molecules and by the minimum state of elastic free energy of liquid crystal due to grooves produced by rubbing. The surface anchoring strength obtained by the above rubbing is generally strong and the intensity control thereof is difficult. Here, if the surface anchoring strength is too strong, defects such as contrast deterioration and the destruction of the liquid crystal orientation state by physical impact occur. Moreover, the partially non-homogeneous alignment due to grooves formed after rubbing becomes a factor for contrast deterioration.

In order to overcome the limitation of the orientation layer manufactured using a polymer as described above, an LCD in which liquid crystal molecules are aligned using a liquid crystalline polymer orientation layer is reported. The schematic cross-sectional view of such an LCD is illustrated in FIG. 1.

Referring to FIG. 1, transparent electrodes 12 made of such material as indium-tin oxide (ITO) are coated on a pair of substrates 11, respectively. Liquid crystalline polymer orientation layers 13 are formed on the surfaces of the ITO electrodes 12, and spacers 15 for keeping a constant thickness and liquid crystal 14 are filled in the space between the thus-formed liquid crystalline polymer orientation layers.

U.S. Pat. No. 4,469,408 discloses a technique using a liquid crystalline polymer film as the liquid crystal orientation layer. Here, liquid crystalline polymer is coated on the transparent electrodes, and then an electric field is applied to change the orientation of the liquid crystalline polymer molecules to thereby change the orientation state of the liquid crystal.

U.S. Pat. No. 5,067,797 discloses an LCD manufactured by attaching a thin polymer film obtained by dissolving polymer material in a solvent and then dispersing the polymer in water. The dispersed film is then drawn and taken up in a given direction to thereby align polymer chains in a given direction. More rubbing or pressing in one direction can be applied by means of a roller when liquid crystalline polymer film is used. At this time, since the thickness of the orientation layer is as thin as 0.1 μm, the optical phase retardation of the transmitted light is negligible during operation.

However, in TN, STN, FLC and electrically controllable bi-refringence (ECB) LCDs, an optical phase retardation film is used to enhance contrast. One or two films are attached on the outside of the substrates, and a protection layer, waterproofing layer or the like should be attached thereon. Finally, the overall thickness of the device becomes 100 μm or more and the manufacturing method thereof is very complicated.

SUMMARY OF THE INVENTION

In consideration of the above-mentioned problems, an object of the present invention is to provide a liquid crystal display having the functions of liquid crystal orientation and optical phase retardation, by employing a liquid crystalline polymer orientation layer.

To accomplish the above object, there is provided in the present invention a liquid crystal display comprising a pair of substrates, transparent electrodes respectively formed thereon and liquid crystal material layer inserted between the electrodes, characterized in that a liquid crystalline polymer orientation layer is formed on at least one of the liquid crystal material layers, and the liquid crystalline polymer orientation layer functions as an optical phase retardation film.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

Figure 1:
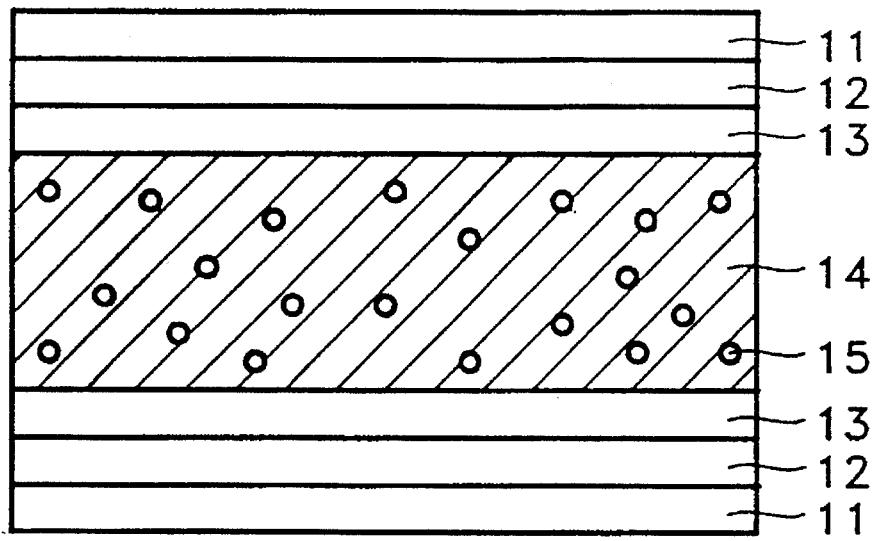
FIG. 1 is a schematic cross-sectional view of the conventional liquid crystal display.

The liquid crystal display according to the present invention induces uniform alignment of liquid crystal molecules through interaction by electromagnetic force between liquid crystal molecules and liquid crystalline polymer molecules in the liquid crystalline polymer orientation layer. The alignment characteristic of the liquid crystal is enhanced so that contrast is greatly enhanced without employing a separate optical phase retardation film, by compensating for the phase retardation of the transmitted light through the use of a liquid crystalline polymer orientation layer functioning as an optical phase retardation film.

That is, in the present invention, an orientation layer is formed as a thin film in which liquid crystalline polymer aligns uniformly and induces a constant alignment of liquid crystal molecules through electromagnetic interaction between molecules in the liquid crystal and liquid crystalline polymer orientation layer, while enhancing contrast by correcting phase retardation of transmitted light using the double refraction characteristic of liquid crystalline polymer.

The liquid crystalline polymer of the present invention exists in the nematic phase, cholesteric phase, smectic phase, etc. at a constant temperature range as does a common monomer state liquid crystal. The polymer can be used as a single component or as a mixture thereof and may be classified as a main chain polymer or a side chain polymer according to their molecular structure. That is, main chain liquid crystalline polymers contain the moiety which imparts liquid crystal characteristics in the main chain or backbone of the polymer, whereas, side chain liquid crystal polymers include a liquid crystal moiety in a side chain. Examples of a main chain liquid crystal polymer include a copolymer of polyethylene terephthalate and p-hydroxybenzoic acid. Photochromic LC copolyester is an example of a side chain liquid crystal polymer.

The liquid crystalline polymer has high viscosity in the liquid crystal state and so reaction velocity is relatively slow. However, if a strong electric or magnetic field is applied in the temperature range of a liquid crystal state, molecules arrange constantly. Once arrangement of liquid crystals is obtained, the state could be easily maintained even in a super-cooled state owing to the high viscosity.

Alternatively, liquid crystalline polymer is coated on the substrates at a temperature of a liquid crystal state, using a bar printing method. Then, anisotropic alignment is obtained due to the anisotropic shape of liquid crystal molecules.

When a liquid crystal in a solid state is heated to clearing temperature or above and then cooled, the liquid crystal state can be obtained and this crystallizes gradually below a specific temperature.

If a liquid crystalline polymer orientation layer is provided with a polymer orientation layer for orienting the liquid crystalline polymer orientation layer on the outer side thereof, constant molecule alignment is induced due to the polymer orientation layer, and the thus-induced alignment remains as a stable state at relatively low temperatures. When a photo-reactable liquid crystalline polymer having this liquid crystal alignment is exposed to light, a cross-linking of liquid crystalline polymer occurs to maintain a more stable molecular alignment. Suitable for use as a photo-reactable liquid crystalline polymer are polymers such as copolysiloxanes.

Alternatively, a fixing effect of the liquid crystalline polymer molecules can be obtained through a process similar to the above process, by mixing a small amount of photo-synthesizable polymer with the liquid crystalline polymer, then inducing alignment of the liquid crystalline molecules and photosynthesizing the polymers. Suitable photosynthesizable polymers include silicon polymers of the type having a siloxane ring as a backbone. Preferred are compounds having two acrylate moieties, i.e., diacrylates.

When the orientation layer is formed of uniformly aligned liquid crystalline polymer molecules, liquid crystal molecules align with optional angle range within 0°–90° with respect to a tangent line at the interface with the liquid crystalline orientation layer, through van der Waals forces or a dipole interaction. Ultimately, the liquid crystalline polymer orientation layer aligns anisotropically, and accordingly, the liquid crystal molecules also align anisotropically and with stability.

If the polymer orientation layer for orienting liquid crystalline polymer is rubbed with a soft cloth (e.g., cotton), similar grooves as in the case of polyimide rubbing are produced and this induces liquid crystal alignment in the parallel or perpendicular direction with respect to the rubbing direction, by the same principle as the conventionally rubbed polyimide. In case of rubbing, generally, a liquid crystal homogeneously aligns and the rearrangement of liquid crystalline polymer molecules in the liquid crystalline polymer orientation layer is within several tens of nanometers and is relatively thin with respect to the total thickness of the orientation layer. Therefore, the alignment direction of the liquid crystalline polymer orientation layer and the polymer orientation layer can be established with no relation to each other. That is, the rubbing direction of the polymer orientation layer for orienting the liquid crystalline polymer orientation layer can be optically selected from 0°–360° with respect to the alignment direction of the liquid crystalline orientation layer.

The liquid crystal material in the present invention preferably has at least one phase of nematic, smectic c* or cholesteric.

Figure 2:
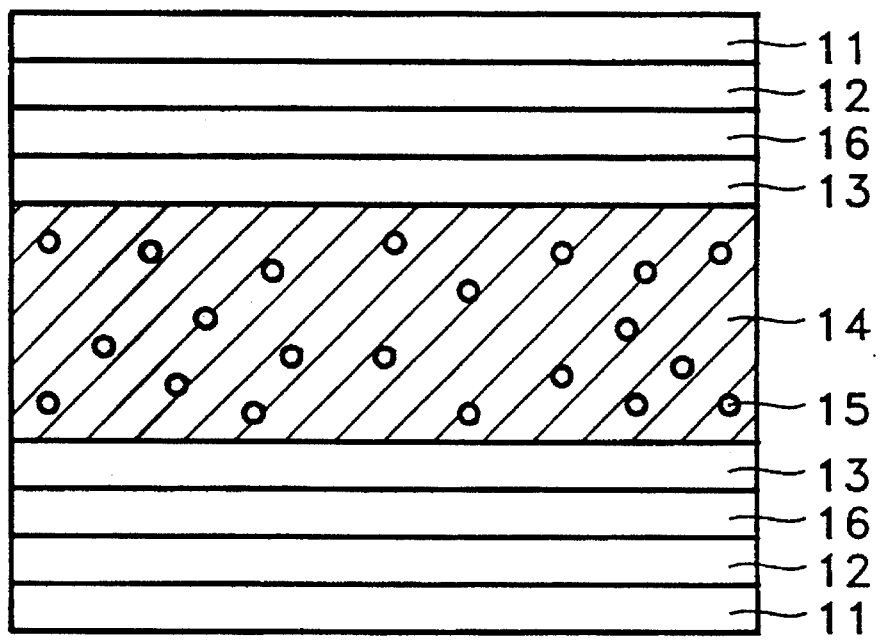
FIG. 2 is a schematic cross-sectional view of the liquid crystal display according to an embodiment of the present invention.

FIG. 2 is a schematic cross-sectional view of the liquid crystal display according to an embodiment of the present invention in which liquid crystalline polymer molecules are homogeneously aligned through forming a polymer orientation layer between the liquid crystalline polymer orientation layer and an electrode. On the transparent substrates 11 coated with ITO electrodes 12, a polymer orientation layer 16 for orienting a liquid crystalline polymer orientation layer is formed. Then, on the polymer orientation layer 16, a liquid crystalline polymer orientation layer 13 is formed and in the space therebetween, liquid crystal material 14 and spacers 15 are injected. The polymer orientation layer 16 for orienting the liquid crystalline polymer is preferably formed of rubbed polymer.

When the liquid crystalline polymer orientation layer for liquid crystal is used as an optical phase retardation film, the film is preferably thicker than 0.1 μm. At this time, the range of Δnd varies according to the dimension of the optical phase retardation, but from 0.01 μm to 0.3 μm for a small optical phase retardation and from 0.1 μm to 1.5 μm for a large optical phase retardation is preferable.

Since double refraction is a characteristic of liquid crystals, if a liquid crystalline polymer aligns anisotropically, the polymer also attains double refraction properties as the conventional liquid crystal. Therefore, when a liquid crystalline polymer is used for the purpose of orientation, optical phase retardation appears and the double refractive index of the liquid crystalline polymer is generally about 0.005–0.3, and when coating only for orientation, the preferable thickness is below 0.1 μm. As a result, the product of the double refractive index (Δn) of the liquid crystalline polymer orientation layer 13 and its thickness (d) is below 0.03 μm (i.e., Δnd<0.03 μm). The change in optical characteristics due to the double refraction of the orientation layer can be corrected when designing a panel and thus does not present much of a problem.

The aforementioned TN, STN, FLC and ECB-type liquid crystal displays each need an optical phase retardation film for improving optical characteristics. However, a liquid crystal display in which a liquid crystal is oriented by a liquid crystalline polymer orientation layer having the function of optical phase retardation without an optical phase retardation film can be manufactured using the double refraction characteristics of the liquid crystalline polymer orientation layer.

As described above, the liquid crystal display according to the present invention has enhanced contrast without a separate optical phase retardation film. Moreover, since the liquid crystalline polymer orientation layer which acts as the optical phase retardation film is provided in the display, no additional layer, e.g., a protection layer or waterproofing layer, is needed. The liquid crystalline polymer layer can be formed simply by coating, and accordingly, the manufacturing process is simple and the overall thickness of the display is thin.

What is claimed is:

1. A liquid crystal display comprising a pair of substrates, transparent electrodes respectively formed thereon in facing relationship, and a liquid crystal material layer inserted between the electrodes, wherein a liquid crystalline polymer orientation layer, in which the product of the double refractive index of said liquid crystalline polymer orientation layer and the thickness of said layer ranges from 0.01 μm to 1.5 μm, is formed on at least one surface of said liquid crystal material layers, and said liquid crystalline polymer orientation layer functions simultaneously as a liquid crystal orientation layer and as an optical phase retardation film.

2. A liquid crystal display as claimed in claim 1, wherein a polymer orientation layer for orienting said liquid crystalline polymer is formed between said liquid crystalline polymer orientation layer and said transparent electrode.

3. A liquid crystal display as claimed in claim 2, wherein said polymer orientation layer for orienting said liquid crystalline polymer consists of polyimide.

4. A liquid crystal display as claimed in claim 2, wherein the alignment direction of said liquid crystalline polymer orientation layer is independent of the rubbing direction of said polymer orientation layer.

5. A liquid crystal display as claimed in claim 1, wherein said liquid crystalline polymer orientation layer includes a liquid crystalline polymer which is prepared from a single component of main chain or side chain liquid crystallize polymer or a mixture thereof.

6. A liquid crystal display as claimed in claim 5, wherein said liquid crystalline polymer orientation layer is a main chain liquid crystalline polymer.

7. A liquid crystal display as claimed in claim 6, wherein said main chain liquid crystalline polymer is a copolymer of polyethylene terephthalate and p-hydroxybenzoic acid.

8. A liquid crystal display as claimed in claim 5, wherein said liquid crystalline polymer orientation layer is a side chain liquid crystalline polymer.

9. A liquid crystal display as claimed in claim 8, wherein said side chain liquid crystalline polymer is a photo-chromic LC copolyester.

10. A liquid crystal display as claimed in claim 1, wherein said liquid crystalline polymer orientation layer includes a liquid crystalline polymer which has at least one phase selected from the group consisting of nematic, cholesteric, and smectic.

11. A liquid crystal display as claimed in claim 1, wherein said liquid crystalline polymer orientation layer further comprises a photo-synthesizable polymer.

12. A liquid crystal display as claimed in claim 11, wherein said photo-synthesizable polymer is a silicon polymer having a siloxane ring as a backbone.

13. A liquid crystal display as claimed in claim 12, wherein said silicon polymer is a diacrylate.

14. A liquid crystal display as claimed in claim 1, wherein said liquid crystal material has at least one phase of nematic, smectic c* or cholesteric.

15. A liquid crystal display comprising a pair of substrates, transparent electrodes respectively formed thereon in facing relationship, a liquid crystal material layer inserted between the electrodes, a liquid crystalline polymer orientation layer formed on at least one surface of said liquid crystal material layers, and a polymer orientation layer for orienting said liquid crystal polymer formed between said liquid crystalline polymer orientation layer and said transparent electrode, wherein said liquid crystalline polymer orientation layer functions simultaneously as a liquid crystal orientation layer and as an optical phase retardation film.

16. A liquid crystal display as claimed in claim 15, wherein said liquid crystalline polymer orientation layer is a polyimide.

17. A liquid crystal display as claimed in claim 15, wherein the alignment direction of said liquid crystalline polymer orientation layer is independent of the rubbing direction of said polymer orientation layer.

\* \* \* \* \*